June 5, 1934.  P. HECKENDORF  1,961,492
AUTOMOBILE DIRECTION SIGNAL
Filed Nov. 14, 1930  2 Sheets-Sheet 1
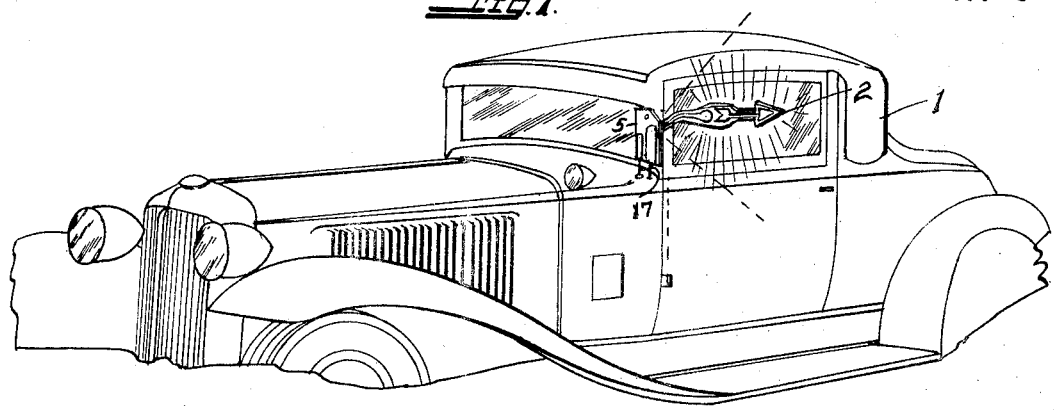
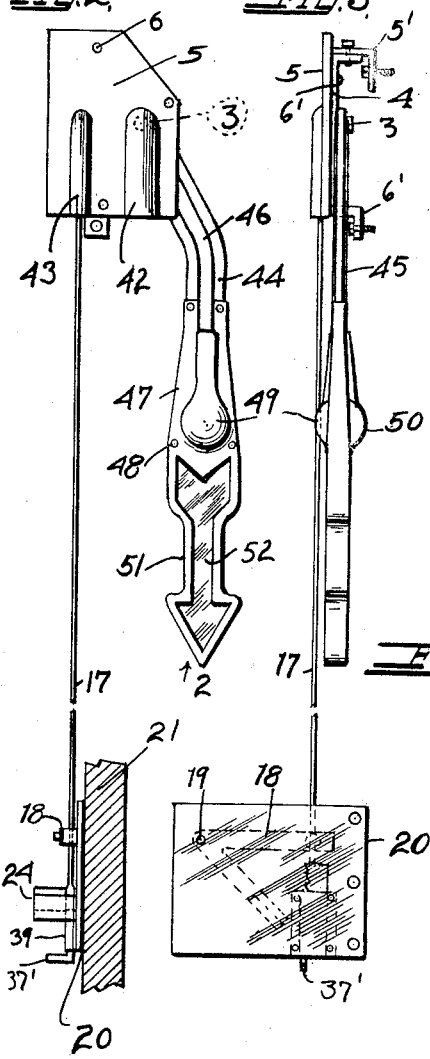
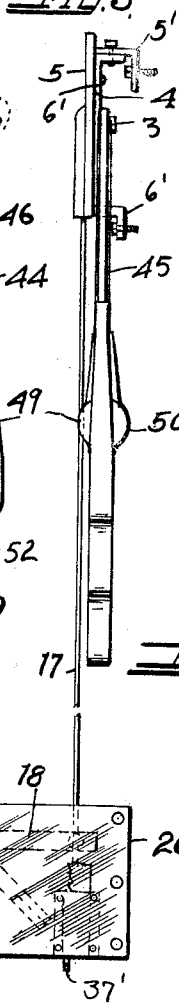
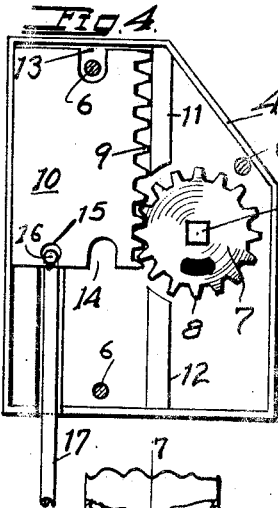
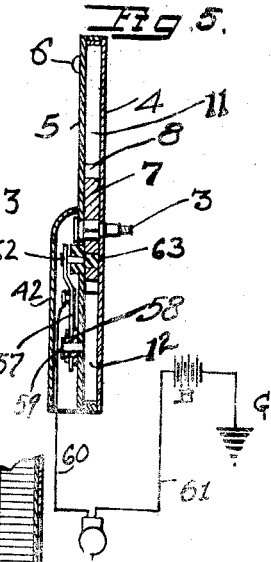
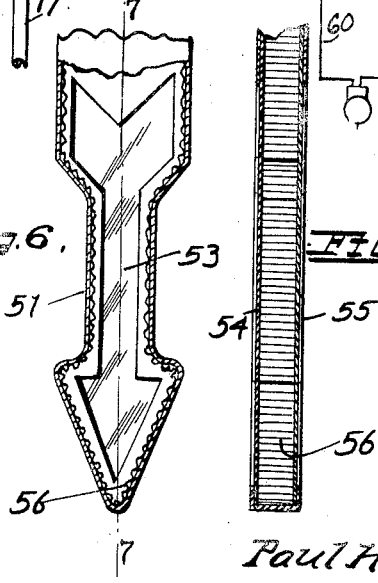
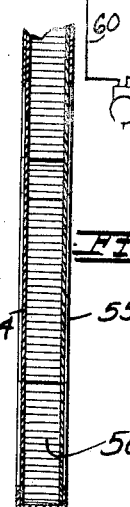
INVENTOR.
Paul Heckendorf
BY
John H. Morgan
ATTORNEY.

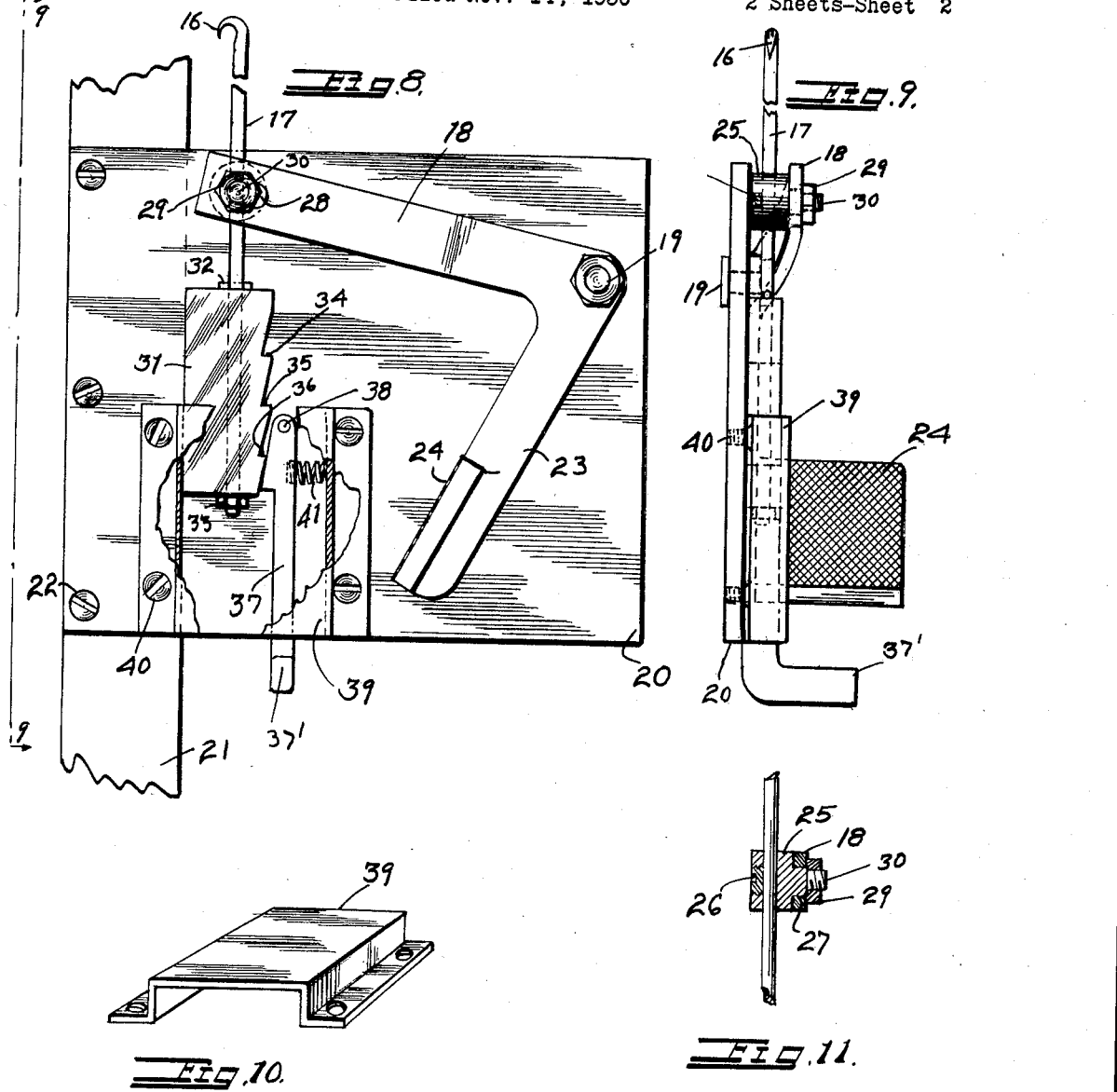

Patented June 5, 1934

1,961,492

UNITED STATES PATENT OFFICE 1,961,492

AUTOMOBILE DIRECTION SIGNAL

Paul Heckendorf, San Francisco, Calif., assignor to Paul P. Gutierrez, Watsonville, Calif.

Application November 14, 1930, Serial No. 495,629

2 Claims. (Cl. 116—54)

This invention relates to motor vehicle direction indicators, and more particularly to a foot operated device to indicate stop and turning signals for use on automobiles and motor trucks.

Many devices of this kind have been invented but none have been found to fully satisfy the requirements of motor vehicle drivers, and among the objects of my invention one is to produce a device of this kind that will be as free from former objections as possible.

Another object is to provide a signal mechanism that is easily attached to the vehicle on which it is to be used and which is not expensive to manufacture.

Another object of this invention is to provide a hollow arm having a transparent colored arrow or other like character and a concealed electric bulb that lights up as the arm is raised, and the light of which is reflected out through the side openings which are covered with colored transparent material.

Another object is to provide a corrugated reflecting surface which consists of a strip of material adapted to cover the inside end walls, and to act to hold the transparent material in place.

Other objects will appear to those skilled in this art to which it appertains as the description progresses.

As embodiment of the invention is shown in the accompanying drawings in which the same reference numeral is applied to the same portion throughout the several views, and of which there may be modifications.

Figure 1 is a perspective view of the upper portion of an automobile showing the signal arm in the horizontal position.

Figure 2 is a front view of the device complete, detached from the vehicle.

Figure 3 is a side view of the device looking from the right of Figure 2.

Figure 4 is a view of the rack and pinion housing with the cover removed somewhat enlarged.

Figure 5 is an edge view of Figure 4, but showing the cover in place and showing the electrical connection.

Figure 6 is an enlarged sectional view of the outer end of the arm.

Figure 7 is a section taken on line 7—7 of Figure 6.

Figure 8 is an enlarged detail view of the foot pedal operating mechanism.

Figure 9 is an end view of Figure 8 taken from the left hand side thereof as indicated by the line 9—9.

Figure 10 is a detail of the housing member for the ratchet slide in perspective.

Figure 11 is a detail of the fastening means to secure the operating rod to the bell crank lever.

The numeral 1 represents the upper portion of an automobile, and 2, the arrow shaped arm is fixed on the bolt 3 which is pivoted in the housing 4. This housing has the cover 5, which is secured by screws 6. The housing is attached to the automobile by the adjustable bracket 5' and the stationary bracket 6'.

On the rotatable bolt 3 having a squared portion, inside the housing is fixed the toothed pinion 7 which turns therewith and has teeth 8 meshing with the teeth 9 on the flat rack 10, which is adapted to slide up and down to rotate the pinion. Guides 11 and 12, are provided for the rack. Openings 13 and 14 are provided in the rack to allow for the screws 6. There is an opening 15 in the rack in which the end 16 of rod 17 is hooked. This rod extends down through an opening in the bottom of the housing to the bell crank foot pedal arm 18, which is pivoted at 19 to the plate 20, which is secured to the post 21 of an automobile by the screws 22. The other arm 23 of the bell crank lever has the projecting foot pedal member 24.

The rod 17 passes through the stud bolt 25 and is secured by the set screw 26 and said stud bolt has the bearing 27 for the slotted hole 28 of the arm 18 to allow for the path of motion of the arm. A nut 29 on the threaded portion 30 acts to hold the arm in place.

The lower end of the rod 17 passes through the ratchet plate 31 and is secured by the pin 32 and nut 33. Notches 34, 35 and 36 are adapted to be engaged successively by the pawl 37 pivoted at 38 on the plate 20. A housing member 39 is provided for the ratchet plate to slide in, and is secured to the plate 20 by the screws 40. A spring 41 causes the pawl to snap into the ratchet notches as the plate is moved down. The pawl 37 has the bent out portion 37' so that it can be released by the foot that operates the pedal.

Raised portions 42 and 43 of the cover 5 allow room for the head of bolt 3, electrical connections and the rod 17.

The arm 2, comprises the front side 44, and the back side 45, fitting tightly together and having the raised portion 46 to allow room for the insulated wires leading to the lamp socket, and plate 47 held in place by screws 48, is adapted to be removed to change lamp bulbs when required.

The raised portions 49 and 50 have the contour of the bulb and socket so as to fit thereover.

The arm is hollow from the lamp bulb to the end of the arm and is formed in the shape of an arrow as shown at 51. Openings 52 and 53, cut out in the form of arrows have each a sheet of colored transparent material, 54 and 55 cut out to fit the contour of the inside of the arrow body and held against the sides of the arrow body, and over the openings by the edges of the corrugated metal strip 56 which is bent around to the contour of the inside of the arrow. The corrugated metal strip has a bright reflecting surface to aid in throwing light from the bulb out through the colored transparent arrow shaped openings, red being used for the sheets 54 and 55 in this instance therefor.

An electric-contact strip 57 is mounted on the cover 5 and insulated therefrom by the insulator 58, the screw 59 is in contact with the cover, but is insulated from the contact strip 57, and wire 60 in contact with the strip 57 leads to the lamp, and wire 61 leads from the lamp to one terminal of the battery B. When the arm 2 hangs straight down, the terminal 62 of the contact strip 57 is in contact with the block of insulating material 63 set in the pinion 7, but when the pinion 7 is moved in raising the arm 2, so that the terminal 62 is off of the insulation 63 and in contact with the metal of the pinion 7, the wire 60 completes the circuit by means of the strip 57, the terminal 62, the pinion 7 and frame 4, the frame 4 and pinion 7 being grounded, the circuit is complete to the other terminal of the battery at G, and thus the lamp bulb in the arm is illuminated while the arm is raised, and when it is down the block of insulating material breaks the circuit.

In operation the pivoted arrow acts to give the same signals as given by the arm of the driver, according to the traffic law, that is: the arm is held straight out for "stop," up at an angle for a "right turn," and down at an angle for a "left turn."

When the pedal is pressed, the rod 17 pulls the rack down and turns the pinion, and with it the arm, as the pinion moves, the contact terminal leaves the insulation, and contacts with the side of the pinion and lights the bulb, and it remains lighted until the arm hangs straight down again.

The plate having the pedal operating mechanism is mounted convenient to the driver's left foot so that he has to move his foot back very little when operating the turn and stop signals, and after the turn has been made he presses on the pawl member 37' and the arrow drops back to the vertical depending position and the light is off.

And thus it will be seen that a very compact mechanism has been evolved for operating a direction signal, and one that can be easily installed.

Having thus described my invention what I desire to secure by Letters Patent of the United States is as follows, but modification may be made in carrying out the invention as shown in the drawings and in the particularly described form thereof within the purview of the annexed claims.

I claim:

1. A signal comprising stamped sheet metal portions fitted together and shaped to form an arm having a hollow arrow-like lower portion and having a recess for an electric lamp socket and lamp bulb, a recess for the lamp cord leading to said socket, and cut out portions in the front and rear faces of said lower portion, and transparent material closing said cut out portions, the end walls of said lower portion holding said material in position and being provided with interior reflecting surfaces.

2. A signal comprising stamped sheet metal members fitted together and shaped to form an arm having a hollow arrow like lower portion and a recess for an electric lamp socket and lamp bulb, a recess for the lamp cord leading to said socket, means in the upper portion to pivot said arm, cut out portions in the front and rear faces having the outline of an arrow in the lower portion, and transparent material closing said cut out portions, the end walls of said lower portion adapted to hold the said material in position and being provided with corrugated interior reflecting surfaces.

PAUL HECKENDORF.